(12) United States Patent
Bakker et al.

(10) Patent No.: US 7,876,719 B2
(45) Date of Patent: Jan. 25, 2011

(54) APPARATUS, AND ASSOCIATED METHOD, FOR CONFIGURING AN IMS SERVICE FOR USE BY A CIRCUIT-SWITCHED DEVICE

(75) Inventors: Jan John-Luc Bakker, Keller, TX (US); Adrian Buckley, Tracy, CA (US)

(73) Assignee: Research In Motion Limited, Waterloo (CA)

( * ) Notice: Subject to any disclaimer, the term of this patent is extended or adjusted under 35 U.S.C. 154(b) by 734 days.

(21) Appl. No.: 11/764,569

(22) Filed: Jun. 18, 2007

(65) Prior Publication Data

US 2008/0310331 A1    Dec. 18, 2008

(51) Int. Cl.
*H04B 7/00* (2006.01)
(52) U.S. Cl. .................. 370/310; 370/352; 370/353
(58) Field of Classification Search .......... 370/310, 370/299, 335, 352, 353, 354, 355, 356, 400, 370/395.52; 455/433, 445, 450, 552.1, 466
See application file for complete search history.

(56) References Cited

U.S. PATENT DOCUMENTS

2005/0288045 A1*  12/2005  Yang et al. ............. 455/466
2010/0074154 A1*  3/2010  Astrom et al. ........... 370/310

FOREIGN PATENT DOCUMENTS

EP    1744491  A1    1/2007
WO    2005-039132  A1    4/2005

OTHER PUBLICATIONS

ETSI: "Digital cellular telecommunications system (Phase 2+); Universal Mobile Telecommunications System (UMTS); IP Multimedia Subsystem (IMS); Stage 2"; (3GPP TS 23.228 version 7.6.0 Release 7); ETSI TS 123 228 V7.6.0 (Dec. 2006) Technical Specification; Dec. 11, 2006, pp. 1-217.
3GPP: "3rd Generation Partnership Project:Technical Specification Group Services and System Aspects; IP Multimedia System (IMS) centralized services (Release 8)"; 3GPP TR 23.892 V1.0.0 (2207-06); XP-002456744; [Online} Jun. 13, 2007, pp. 1-69, XP002456744; retrieved from Internet: URL:http://www.3gpp.org/ftp/Specs/archive/23_series/23.892/23892-100.zip>.
Mathieu Antoine: "Improving the Customer Experience in Deploying IMS Services Using Integrated Data Management"; HP Software Universe 2006, [Online] Dec. 15, 2006, XP002456745; Vienna, Austria; retrieved from the Internet: URL:http://h40084.www4.hp.com/events/universe/2006pe/pdfs/technical_tutorial/we-1145-8.pdf>.

* cited by examiner

*Primary Examiner*—Jean A Gelin

(57) ABSTRACT

Apparatus, and an associated method, to facilitate performance of an IMS (IP Multimedia Subsystem) service to a circuit-switched-connected user equipment. The user equipment includes a USSD message generator that generates an initiation message that is sent to a network of a radio communication system. The message is routed through the network to an entity that decodes the USSD message to form an XCAP message. The XCAP message is routed to an associated service node that operates responsive to the XCAP message.

24 Claims, 6 Drawing Sheets

APPARATUS, AND ASSOCIATED METHOD, FOR CONFIGURING AN IMS SERVICE FOR USE BY A CIRCUIT-SWITCHED DEVICE

The present invention relates generally to a manner by which to provide an IMS (IP Multimedia Subsystem)-hosted communication service to a circuit-switched wireless device. More particularly, the present invention relates to apparatus, and an associated method by which to permit the circuit-switched, wireless device to configure an IMS service.

Management of network service related information is initiated by the wireless device through the sending of a USSD, SMS, or other, initiation message by the wireless device. The initiation message is decoded at the network, to form an XCAP message, usable by an associated service (AS) node, pursuant to the configuration process.

BACKGROUND OF THE INVENTION

Many changes in society have been brought about as a result of advancements in technology. Advancements in communication technology, for instance, have significantly increased the availability of, and types of, communication services by which information can be communicated between communication stations. Perhaps nowhere are the improved capabilities more evident than in radio communication services, such as those provided through use of a mobile station. Mobile stations are conventionally utilized in conjunction with cellular, or cellular-like communication networks. While mobile stations were generally first known, and used, for circuit-switched voice communications, increasingly, more data-intensive communication services are provided by, and with, new generation mobile stations.

Through use of packet-switched technologies, multimedia, and other data-intensive, communication services are carried out. The packet-switched services, and network entities through which packet-switched data is routed differ in various regards to the network entities and communication paths through which circuit-switched data, communicated pursuant to a circuit-switched communication service, is routed. Mobile stations are regularly now constructed to permit their operation both pursuant to packet-switched communications and pursuant to circuit-switched communications. Voice communications can also be carried out using packet-switched connections.

In spite of the capability of a mobile station regularly to be able to communicate both pursuant to circuit-switched communications and packet-switched communications, for any of various reasons, a mobile station might not be able to receive, or otherwise communicate, pursuant to a packet-switched service. The mobile station may, if fact, not be packet-switched capable. Or, the subscription pursuant to which the mobile station operates is not permitting of its reception of packet-switched data. Or, even if the mobile station is packet-switched capable, the packet-switched network might not support the particular media that is to be communicated pursuant to the communication service. Additionally, even if the mobile station is packet-switched capable, user preference might be to utilize circuit-switched connections. Or, operator, or other, policy might be prohibitive of packet-switched access.

Therefore, there are regular occurrences of situations in which a mobile station is connected in a circuit-switched connection with a communication network when a packet-switched service, such as an IMS (IP Multimedia Subsystem) service is to be or is desired to be, performed. The mobile station, so-connected, is herein referred to as an ICS UE (IMS Circuit-Switched User Equipment). Network-embodied functionality provides configurable IMS services, but such configurable services are generally only readily configurable by a packet-switched connected mobile station.

For a circuit-switched mobile station, i.e., the ICS UE, to configure an IMS centralized service, conventionally-available configuration schemes exhibit various problems. One manner by which to permit the circuit-switched mobile station to configure an IMS service requires the user of the mobile station to form a call connection with a customer service entity. And, in turn, the customer service entity performs the required actions by which to configure the IMS service. However, a call to a customer service entity is generally costly and, in any event, is inconsistent with goals of an operator generally to cut down on customer service costs. In another conventional manner by which to configure an IMS service, the user of the circuit-switched mobile station uses a web browser, via a packet-switched connection, or an other interface, such as a Ut interface. However, use of this procedure requires the availability of a packet-switched connection. In some situations, a packet-switched network connection is unavailable, or policy or user preference precludes use of a packet-switched connection.

Existing manners, therefore, by which to provide for a circuit-switched mobile station to configure an IMS service are inadequate. An improved manner by which to permit the circuit-switched mobile station to configure an IMS service would therefore be advantageous.

It is in light of this background information related to IMS services in a communication system that the significant improvements of the present invention have evolved.

BRIEF DESCRIPTION OF THE DRAWINGS

FIGS. 2-1 and 2-2 illustrate message sequence diagrams representative of signaling generated during operation of an embodiment of the present invention.

DETAILED DESCRIPTION

Figure 1:
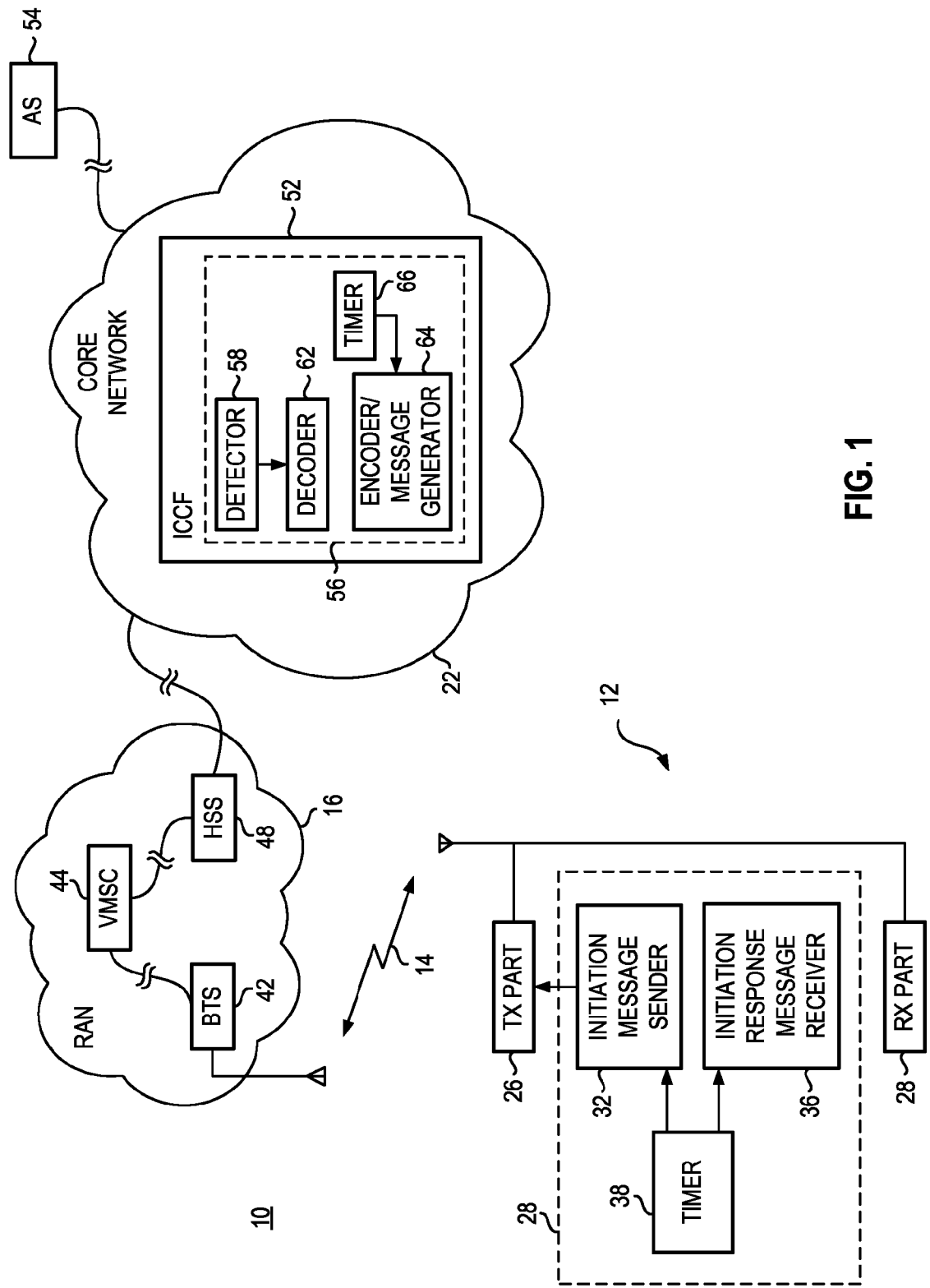
FIG. 1 illustrates a functional block diagram of a radio communication system in which an embodiment of the present invention is embodied.

The present invention, accordingly, advantageously provides apparatus, and an associated method, by which to provide an IMS-hosted communication service to a circuit-switched wireless device.

Through operation of an embodiment of the present invention, a manner is provided by which to permit the circuit-switched wireless device to configure an IMS service.

The wireless device initiates management of network service related information through the generation and transmission of an initiation message. The initiation message comprises, e.g., a USSD message, an SMS message, or other appropriate message. When delivered to the network, the message is decoded to form an XCAP message. An XCAP message is usable by an associated service node at which the IMS service is configured.

In one aspect of the present invention, the wireless device that is to be utilized pursuant to an IMS service is connected in a circuit-switched connection. The wireless device, an IMS Circuit-Switched User Equipment (ICS UE) generates a USSD, or other appropriate, message that is sent, by way of a radio air interface to a network part of a communication system. The USSD, or other, message includes information that is sufficient for a network entity to carry out management of network services related information. If needed, multiple messages are formed that together include the information needed by the network entity.

In another aspect of the present invention, the mobile-originated, USSD, or other, message is detected at the network part of the communication system, such as at a base transceiver station thereof. The message is routed to a network node, such as by way of a mobile switching center, e.g., a VMSC (Visited Mobile Switching Center) and on to the network node, formed of an HSS (Home Subscriber Server) USSD router, service center, or other appropriate network node. The node, in turn, forwards on the USSD, or other, message to another network node, such as a CAAF/ICCF that, in turn, forwards on the message to an appropriate, associated service node by way of a CAAF of an ICCF. A USSD router comprises a device capable of inspecting messages and, upon detection of a USSD message, causes routing of the message to an appropriate network node.

In another aspect of the present invention, the USSD, or other, formatted message, when received at the ICCF, or other network entity, is decoded. The USSD, or other, message is decoded to form an XCAP message that is of a format usable by the Associated Service (AS) node. And, when forwarded on to the AS node, the AS node operates to perform management of network services related information responsive to the contents of the XCAP formatted message.

In another aspect of the present invention, the associated service node, upon completion of the performance of the management of the network services related information, or otherwise when appropriate, generates an XCAP-formatted, response message that is sent by the AS node to a network node, such as the ICCF.

In another aspect of the present invention, the CAAF of the ICCF, or other network node, encodes the XCAP message forwarded by the associated service node into a USSD, or other appropriate, message. If needed, the encoding performs multiple USSD, or other, messages. The message, once encoded, is forwarded on to another network node, such as the HSS of the home network, then on to the VMSC of the visited network, a USSD router, service center, etc., and then communicated on by way of a radio air interface, to the wireless device.

The circuit-switched-connected wireless device is thereby able to configure an IMS centralized service, thereby to permit the wireless device, so-connected, to communicate pursuant to performance of the IMS service. A service classified as a IMS Centralized Service will only use media compatible with CS networks if a UE or a ICS UE is consuming this IMS Centralized Service using CS bearers.

In another aspect of the present invention, the ICCF functionality is embodied at a gsmSCF-HLR. An RUA-AS functionality is also maintained at the ICCF. The gsmSCF-HLR, a MAP-defined entity, comprises an interface between an HLR and a gsmSCF.

In these and other aspects, therefore, apparatus, and an associated method is provided for facilitating the providing of an IMS, IP multimedia subsystem, service. A UE-generated, initiation message is detected. The initiation message has network-decodable information that, when decoded, permit management of network services related information pertaining to the IMS service. An initiation response message is generated responsive to management of network services related information identified in the initiation message.

In another aspect of the present invention, timers are embodied at the UE and at the ICCF, or other appropriate network node. When a timer times out without the occurrence of an expected message delivery or response, an error condition is considered to exist. A message is resent, or inquiry made, and timing restarts. If after a selected number of resends and time-outs of the timer additional attempts do not continue. The selected number (and timer period), e.g., configurable via OTA (over the air) signaling, such as SMS, USSD, GPRS, OMA Device management, etc. Or the selected number and/or period is broadcast to the UE, such as by way of a cell broadcast, MBMS broadcast, or a broadcast on a traditional broadcast channel, such as an SDCCH.

In these and other aspects, further apparatus, and associated methodology, is provided for facilitating the providing of an IMS service to a UE. At least one initiation message is sent from the user equipment. The initiation message has network-decodable information that, when decoded, permits management of network services related information pertaining to the IMS service. At least one initiation response message is received at the user equipment. The initiation response message is generated responsive to management of network services related information in the initiation message.

Referring first, therefore, to FIG. 1, a radio communication system, shown generally at 10, provides for radio communications with wireless devices of which the User Equipment (UE) 12 is representative. The communications with the User Equipment are carried out by way of radio signals communicated on a radio air interface 14. The protocols associated with the communication of signals and other aspects of their communication are set forth in an operating standard promulgated by a standards setting body.

The network part of the communication system includes a Radio Access Network (RAN) 16 and a Core Network (CN) 22. The network is also constructed in conformity with an appropriate operating specification promulgated by a standards setting body.

The user equipment 12 includes transceiver circuitry, here represented by a transmit part 26 and a receive part 28 that provide for the transmission and reception of radio signals upon the radio air interface. The user equipment includes both a mobile equipment part, e.g., a part that includes the transceiver circuitry and a UICC (Universal Integrated Circuit Card), or the like, having a memory device, and which is typically removably connectable to the mobile equipment part. While the user equipment is capable of any of various modes of operation, the user equipment is here capable at least of forming a circuit-switched connection pursuant to a circuit-switched communication service with the network of the communication system. As noted previously, even when connected in the circuit-switched connection, a user of the user equipment might be desirous of utilizing the user equipment pursuant to a packet-switched, IMS (IP Multimedia Subsystem) service. As also noted previously, conventional mechanisms by which to permit configuration of the IMS service to the circuit-switched-connected requires a call to be made to an operator of the network part of the communication system or requires web-based communications. As formation of a call connection with the network operator requires staffing by the network operator to receive the calls, this procedure is relatively costly to the network operator. And, web-based communications might not always be available to the user equipment due to network deployment issues, subscriber or operator policy, or user preference.

Accordingly, the user equipment of an embodiment of the present invention includes apparatus 28 of an embodiment of the present invention. The apparatus 28 is functionally represented, implementable in any desired manner, including algorithms executable by processing circuitry. The apparatus is here shown to include an initiation message sender 32 and an initiation response message receiver 36. The initiation message sender is coupled to the transmit part of the transceiver circuitry of the user equipment, and the initiation response message receiver 36 is coupled to the receiver part of the transceiver circuitry. And, a timer 38 is coupled to the functions 32 and 36.

The radio access network is here shown to include a Base Transceiver Station (BTS) 42, a Visited Mobile Switching Center (VMSC) 44, and a Home Subscriber Server (HSS) 48. The home subscriber server performs various functions including, for instance, subscriber management including service profile storage, authorization, service provisioning, and billing. And, the core network is shown to include an ICCF. In conventional manner, the network portion of the communication system includes other structure and entities, not shown for purposes of simplicity. An associated service node 56 is further shown, here positionable in communication connectivity with the ICCF. Each of the network entities shown in FIG. 1 forms a network node. And, while the description herein of the exemplary implementation shows the VMSC, HSS, and ICCF, more generally, the entities comprise network nodes to, and through, which messages are routable. Also, while the exemplary implementation described herein utilizes USSD messages, in other implementations, other messages, such as SMS messages, are utilized. In such other implementations appropriate structure and entities are utilized. For instance, an SMS message is routed to an SMS service center, and the network portion of the communication system correspondingly includes such entity.

The ICCF also includes apparatus 56 of an embodiment of the present invention. The apparatus 56 is formed of functional entities, implementable in any desired manner, including algorithms executable by processing circuitry. Here, the apparatus 56 is shown to include a detector 58, a decoder 62, and an encoder/message generator 64. The apparatus also includes a timer 66, coupled to the function 64. While the apparatus 56, in the exemplary implementation, is implemented at the ICCF, in other implementations, the functionality of the entities of the apparatus are positioned elsewhere, including distributed amongst several entities.

Operation of an embodiment of the present invention facilitates performance of an IMS service with a circuit-switched-connected user equipment. A user of the user equipment causes initiation of IMS configuration that provides for the performance of the communication service with the user equipment. Examples of IMS-related services configurations include call forwarding information, voice mail parameters, etc.

Specifically, the user causes operation of the initiation message sender 32, such as by way of actuation of actuator of a user interface (not separately shown). The initiation message sender generates and provides to the transmit part a USSD, SMS, or other, message that provides for the initiation of network services related information.

An exemplary coding used in the USSD message generated pursuant to an embodiment of the present invention includes flags, here forming a coding group bit of 1101, defined for IMS centralized services. Their use in one implementation, is as follows:

| Defined for IMS Centralized Services | | |
|---|---|---|
| Bit 1 | Bit 0 | Message Class |
| 0 | 0 | Reserved |
| 0 | 1 | Class 1 Default meaning: ME-specific. |
| 1 | 0 | Reserved |
| 1 | 1 | Reserved |
| Bits 3 and 2 indicate the alphabet being used, as follows: | | |
| Bit 3 | Bit 2 | Alphabet |
| 0 | 0 | Reserved |
| 0 | 1 | 8 bit data |
| 1 | 0 | Reserved |
| 1 | 1 | Reserved |

The transmit part transmits the message by way of the radio air interface, and the message is delivered to the network part of the communication system. The message is routed through the radio access network and on to a network node, here the ICCF 52, at which the apparatus 56 is embodied. The detector 58 detects the delivered message, and the decoder 62 decodes the delivered message to form an XCAP, or other appropriate, message. Once decoded to form the XCAP message, the message is forwarded on to the associated service node 54. The XCAP-formatted message is usable by the associated service node, when forwarded thereto, to configure, or reconfigure, an IMS centralized, or other, service.

The associated service node, in turn, forms an XCAP-formatted message in response, and forwards the XCAP message to the encoder/message generator 64. The entity 64 encodes the XCAP message in to USSD (or other) form, for forwarding on to the user equipment 12 by way of the radio access network and radio air interface. In general, XCAP performs exchanges of URLs and XML documents in corresponding GET, PUT, POST, and DELETE HTTP messages. In some situations, URLs are lengthy. And, similarly, in some situations, XML documents are verbose. In order for the information contained in the XCAP to fit into a USSD message, SMS message, or the like, compression is sometimes advantageously utilized. Compression, such of that set forth in 3GPP document TS23.04, coupled with mandated dictionaries at the network and UE facilitate the compression and recovery of the communicated information. The initiation response receiver detects delivery of the USSD (or other) message to the receive part 26 of the user equipment and provides for further IMS communication functions to be carried out at the user equipment pursuant to the IMS communication service.

Thereby, the circuit-switched-connected UE is provided with an IMS communication service.

Figures 1, 2:
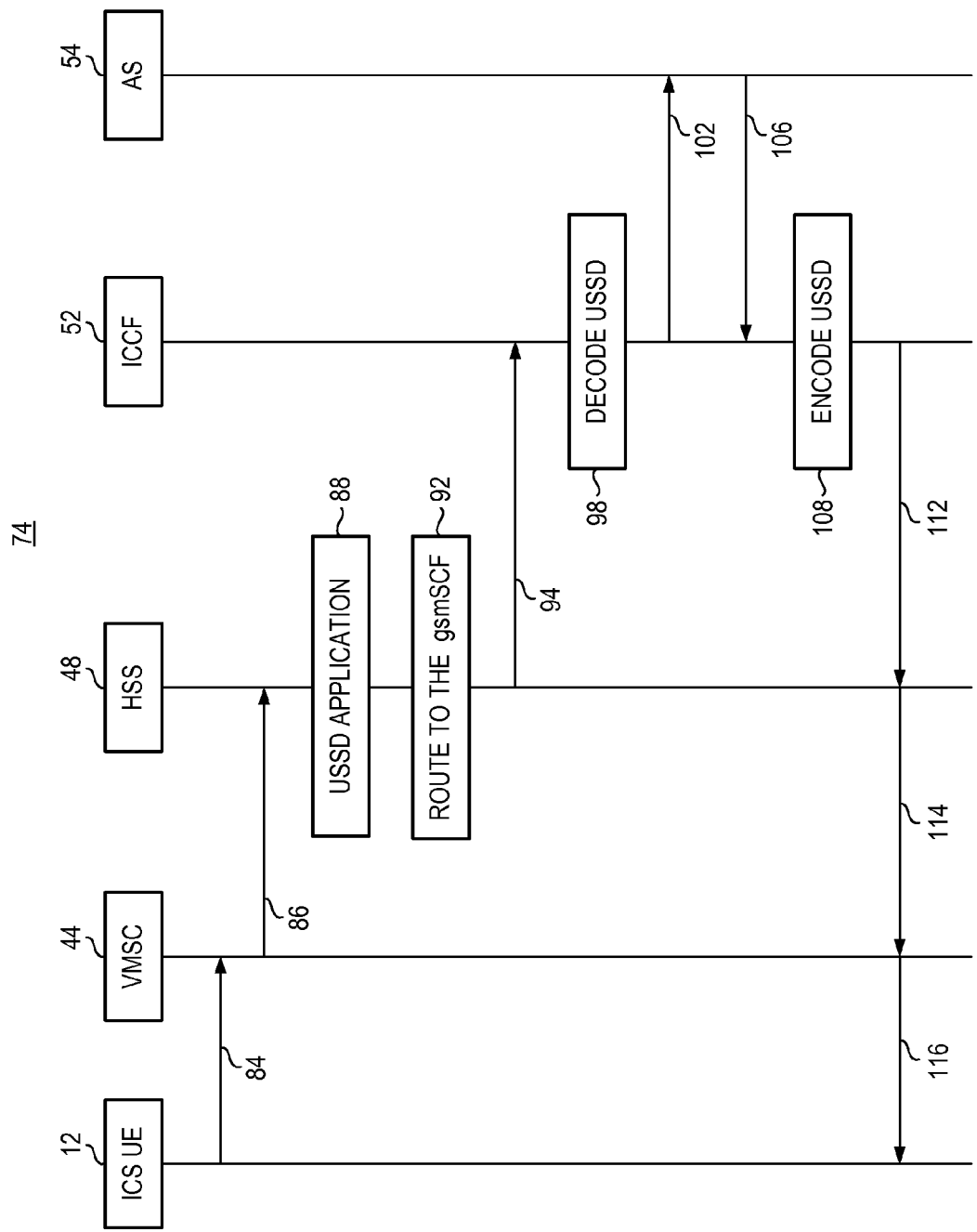
Figure 2:
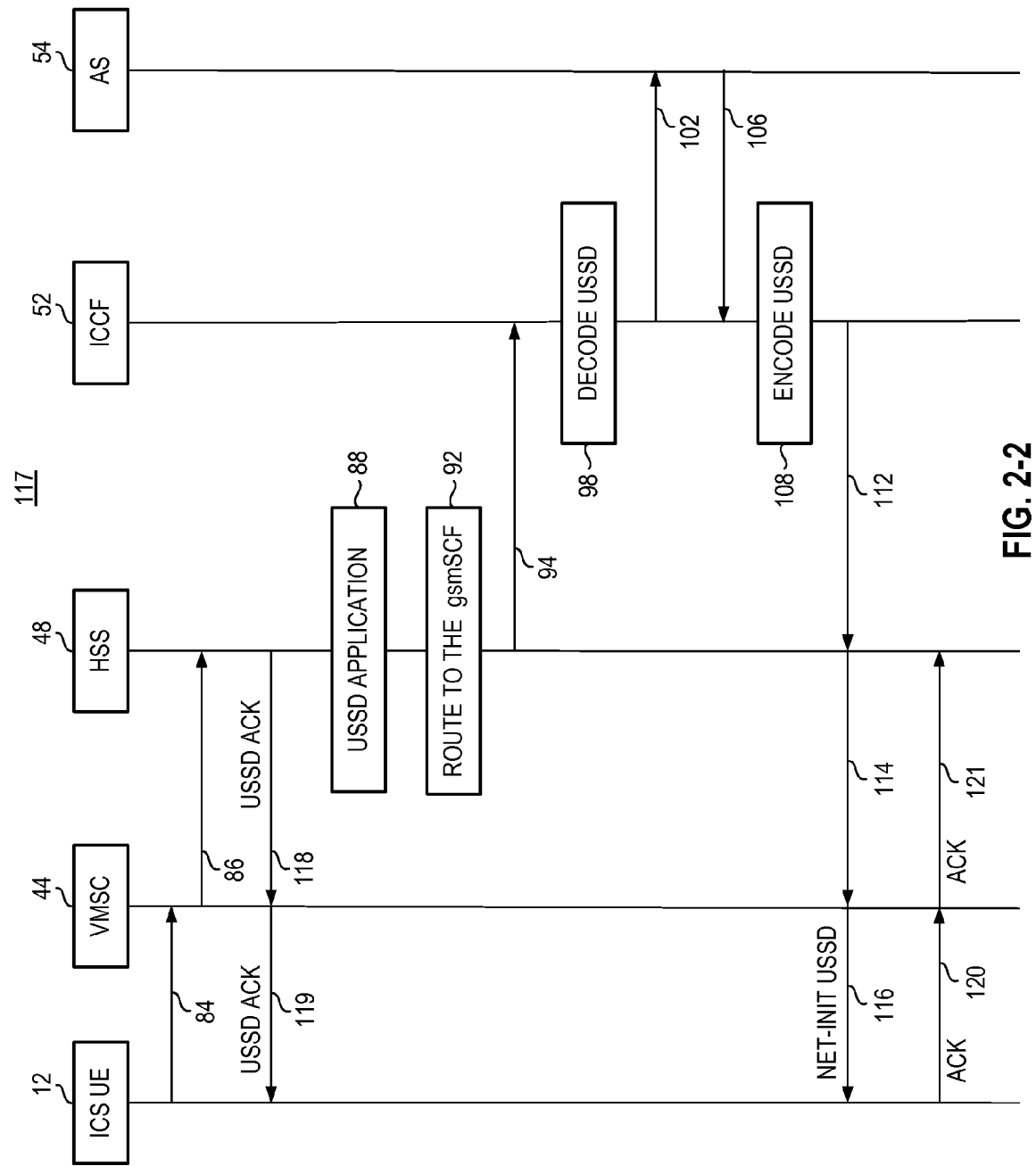

Turning next to FIG. 2-1, a message sequence diagram, shown generally at 74, represents signaling generated pursuant to operation of an embodiment of the present invention. While the signaling represented in the diagram corresponds to the signaling generated pursuant to operation of a communication system that corresponds to that shown in FIG. 1, in other implementations, the generated signaling is analogous but corresponding to the structural entities of such other implementations. And, in general, the network entities are representative of network. First, and as indicated by the segment 84, a USSD, or other, message, is generated at the user equipment and sent, indicated by the segment 84, to the network for routing to the VMSC 44. A timer, such as the timer 35, commences timing. The timer is operable, e.g., as described previously. And, the timer exhibits a configurable time-out period and causes resending of the message, indicated by the segment 84 up to a configurable number of times in absence of detection of an appropriate response. If needed, multiple initiation messages are generated. The user equipment encodes, for an ICCP, sufficient information to permit subsequent decoding of the USSD-formatted message into an XCAP-formatted message. If needed, the UE will be prompted to transmit the remaining messages since it includes the number of data fields included in the UE-generated initiation message. Multiple UE-generated initiation messages may be transmitted in the same USSD transaction. Up to a total of N fields where N can be 128. Note that if the most significant bit is set, 7 consecutive bits are to be interpreted as the number of data fields in the UE-generated initiation message. Otherwise, 3 consecutive bits are to be interpreted as the number of data fields in the UE-generated initiation message. The remaining three or seven bits are encoded in a big-endian order, e.g., most significant bit first. The USSD message is forwarded, indicated by the segment 86, by the VMSC to the HSS 48. The message is forwarded pursuant to standard VMSC procedure to communicate the message to the home network of the UE. As indicated by the blocks 88 and 92, an associated USSD application is performed upon the message, and a decision is made to route the message on to a network node capable of receiving USSD, e.g. a gsmSCF.

Then, and as indicated by the segment 94, the USSD message is forwarded on to the ICCF. As indicated by the segments 84, 86, and 94, the message includes a request type as well as other parameters associated with the message and IMS service.

When delivered to the ICCF, the USSD, or other, message is decoded to form an XCAP message. And, the XCAP message is forwarded, indicated by the segment 102, to the associated service node. A timer, such as the timer 66, commences timing. The timer is operable, e.g., as described previously, with a configurable time-out period and causes resending of the XCAP message up to a configurable number of times.

Subsequent to receipt of the XCAP message, the associated service node generates an XCAP response message, indicated by the segment 106, that is routed to the ICCF. When detected the timer is stopped. The ICCF encodes, indicated by the block 108, the XCAP message to form a USSD, or other, message. And, once encoded in to the USSD, or other, format, the message is routed through the network, indicated by the segments 112, 114 and over the air interface, as indicated by the segment 116, to the user equipment. And, when detected at the UE, its timer is stopped. At the ICCF, the CAAF encodes the SCAP contents of the XCAP message in to one or more USSD messages. A standard service node procedure is used to communicate the USSD message on to the HSS 48, and standard procedures are performed at the HSS and VMSC to communicate the message on to the user equipment.

The USSD message 84 shown in the exemplary signaling of FIG. 2 contains information needed to configure, or to reconfigure, an IMS centralized service. Typically, in IMS services, the Ut reference point contains the XCAP protocol and is used to configure IMS services. IMS centralized services are also IMS services and are also configured using XCAP protocol. XCAP is carried over HTTP, and standardization of IMS services to be contained in XCAP messages is ongoing.

Timers 38 and 66 of the apparatus 28 and 56, operate to time out selected time periods. If, in the absence of delivery of a response, e.g., from the network or from the AS 54, an anomaly condition is alerted. Resending of a message, or other anomaly operation commences.

FIG. 2-2 is similar to that shown in FIG. 2-1, here showing a message sequence diagram 117, identical to that shown in FIG. 2-1 but for the addition of USSD acknowledgment (USSD ACK) messages 118 and 119 returned by the network node 48 to the ICS UE 12. The acknowledgment messages are returned at any time, prior to the messages 114 and 116, here network-initiated USSD messages. And, FIG. 2-2 further shows that the UE 12 generates and sends an acknowledgment to the network-initiated USSDs, here indicated by the segments 120 and 121.

Figure 3:
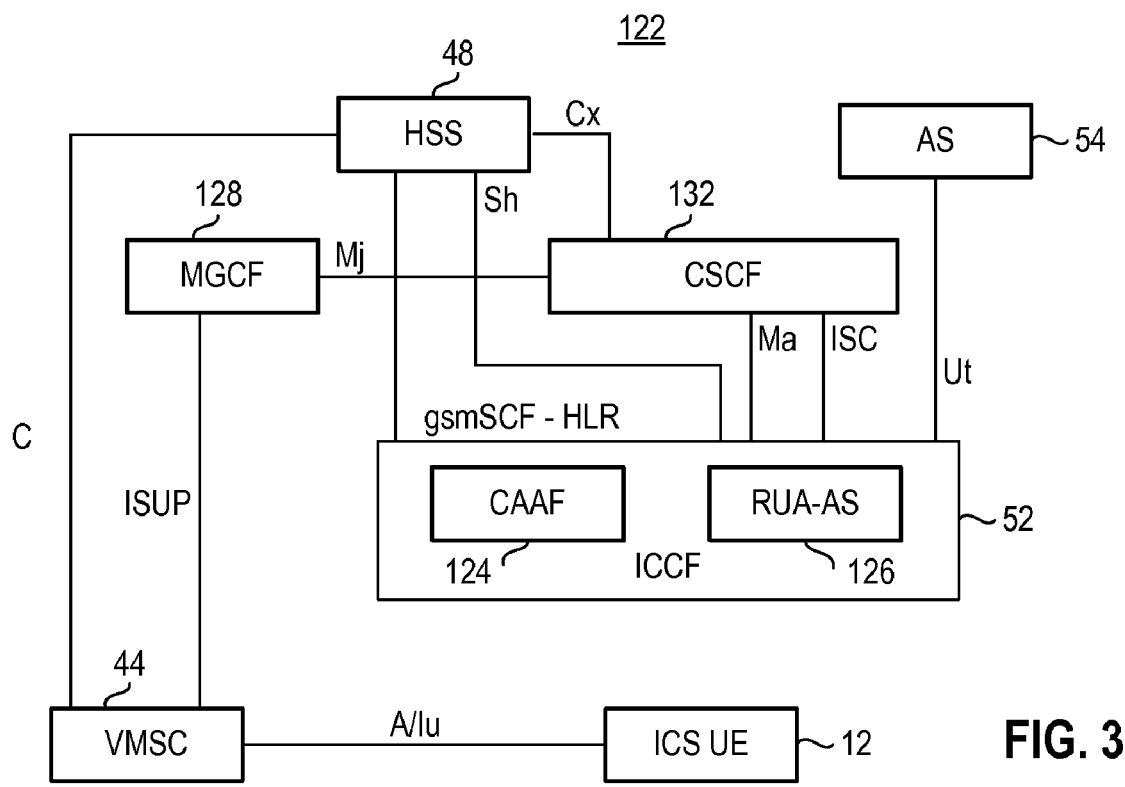
FIG. 3 illustrates a functional block diagram of parts of the network portion of the communication system shown in FIG. 1.

FIG. 3 illustrates a functional block diagram, shown generally at 122, representative of various entities of the radio communication system 10 shown in FIG. 1. Here, again, the user equipment, identified as an IMS, Circuit-Switched UE (ICS UE) is again shown, here connected to the VMSC 44 by way of an A/Iu link. The HSS 48, ICCF 52, and AS 54 are also again shown. The ICCF includes a CAAF 124 and RUA-AS 126. The CAAF 124 presents a MAP/gsmSCF-HLR interface towards the HSS 48 for USSD signaling. The ICCF functionality is essentially identical to an I1-ps approach, described below, except for the inclusion of the CAAF for USD handling. The diagram 122 also includes an MGCF 128 and a CSSF 132.

A Ut interface is formed between the AS 54 and the ICCF, and ISC, Ma, and Sh interfaces extend between the ICCF and the CSCF and HSS, respectively. And, MAP and ISUP interfaces extend between the VMSC and HSS and MGCF, respectively. The realization of the ICCF 52 shown in FIG. 3 forms an I1-cs: unregistered user solution.

Figure 4:
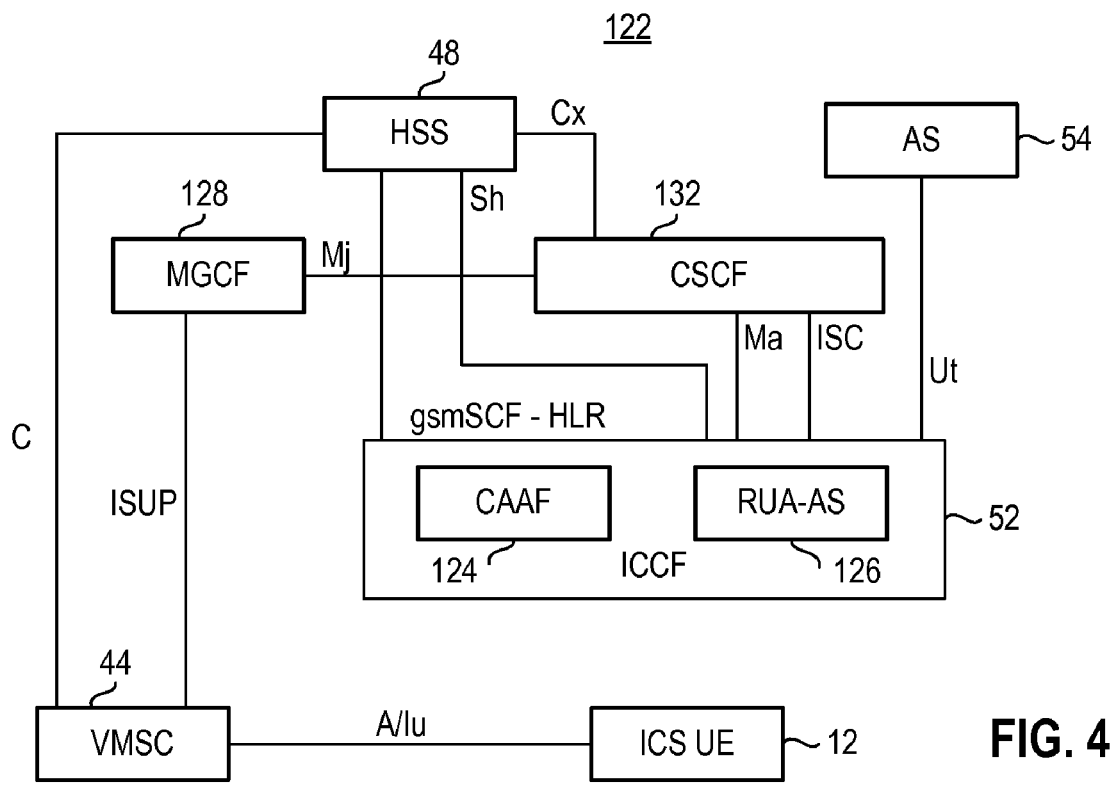
FIG. 4 illustrates a functional block diagram, similar to that shown in FIG. 3, but here showing parts of the network portion pursuant to another embodiment of the present invention.

FIG. 4 illustrates a functional block diagram, also shown at 122, and also again illustrates commonly-referenced entities shown in FIG. 3. The diagram set forth in FIG. 4 is representative of a I1-cs approach: registered user solution-ISC model that is used for realization of I2, i.e., the IMS registration via circuit-switched access, origination, and termination procedures are executed over the ISC interface. Again, the CAAF 124 of the ICCF 52 presents a MAP/gsmSCF-HLR interface towards the HSS for USSD signaling.

Figure 5:
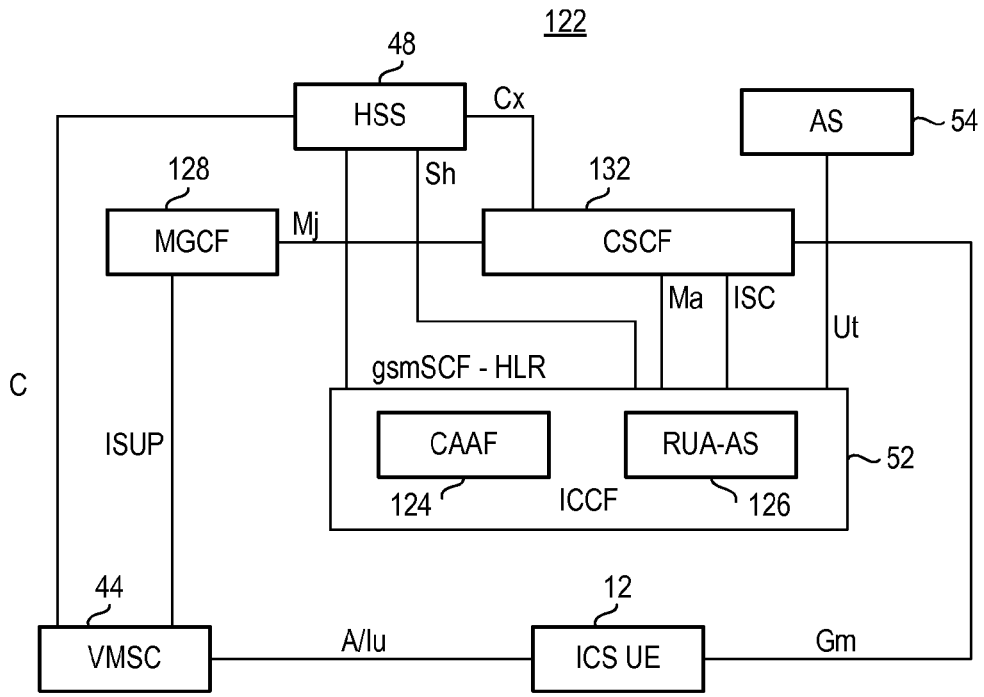
FIG. 5 illustrates a functional block diagram, similar to those shown in FIGS. 3-4, but here of another embodiment of the present invention.

FIG. 5 again illustrates a functional block diagram, again shown at 122, also representative of the communication system 10, shown in FIG. 1, here pursuant to another embodiment of the present invention. The entities are commonly-referenced to those shown in prior figures. In this implementation, an application server approach is represented. The ICCF is realized as an IMS application server with an ISC interface to the S-CSCF for both I1-cs and I1-ps. In this mode, the ICCF is invoked via iFC as the very first SIP AS in an originating call and the last one in terminating calls, i.e., closest to the access. The VCC application server should be either second for originating calls or last for terminating calls.

Figure 6:
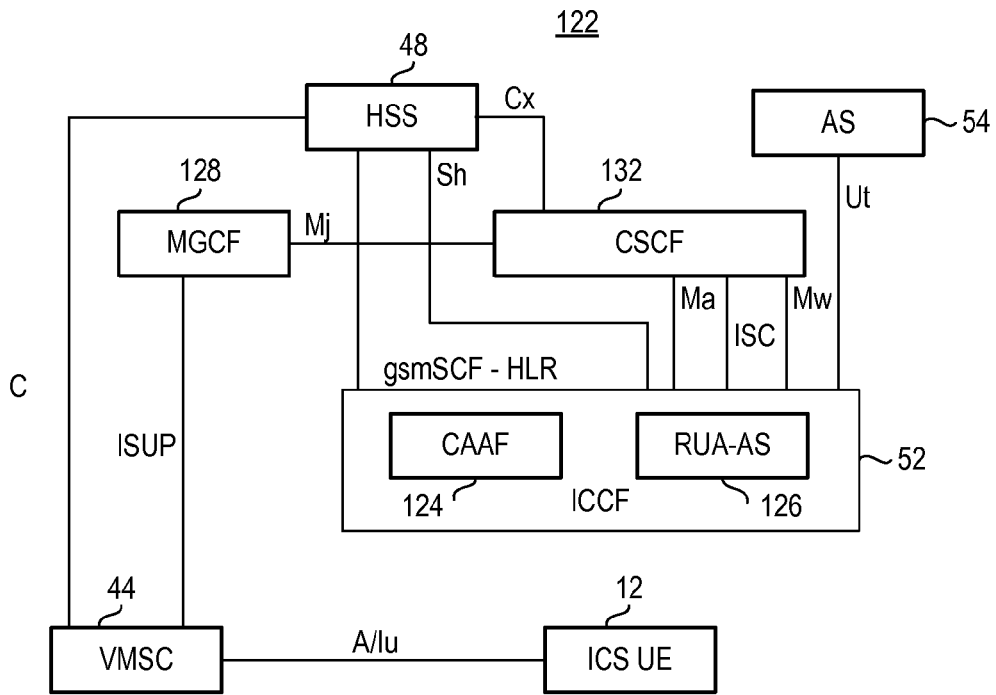
FIG. 6 illustrates a functional block diagram, similar to those shown in FIGS. 3-5, but here of another embodiment of the present invention.

FIG. 6 again illustrates another functional block diagram 122 representative of an implementation of another embodiment of the present invention. The diagram 122, again, includes commonly-referenced entities, shown and described in previous figures. The diagram shown in FIG. 6 is representative of an IMS adaptor model for the ICCF with an WMw reference point and the ISC for I1-cs only. That is to say, in another implementation of the I to reference point between the ICCF and the CSCF is with the Mw reference point to the I-CSCF and the S-CSCF for routing of registration, and Mw reference point for the ICS for routing of originating and terminating calls. In this mode, it acts as an IMS UE remotely controlled from the ICS UE, i.e., an ICS user connected, via CS access, and the ICCF is perceived. ISC and the Ma reference points are used to realize the I1 reference point if PSY routing is used to route a call from the circuit-switched domain to the ICCF.

Figure 7:
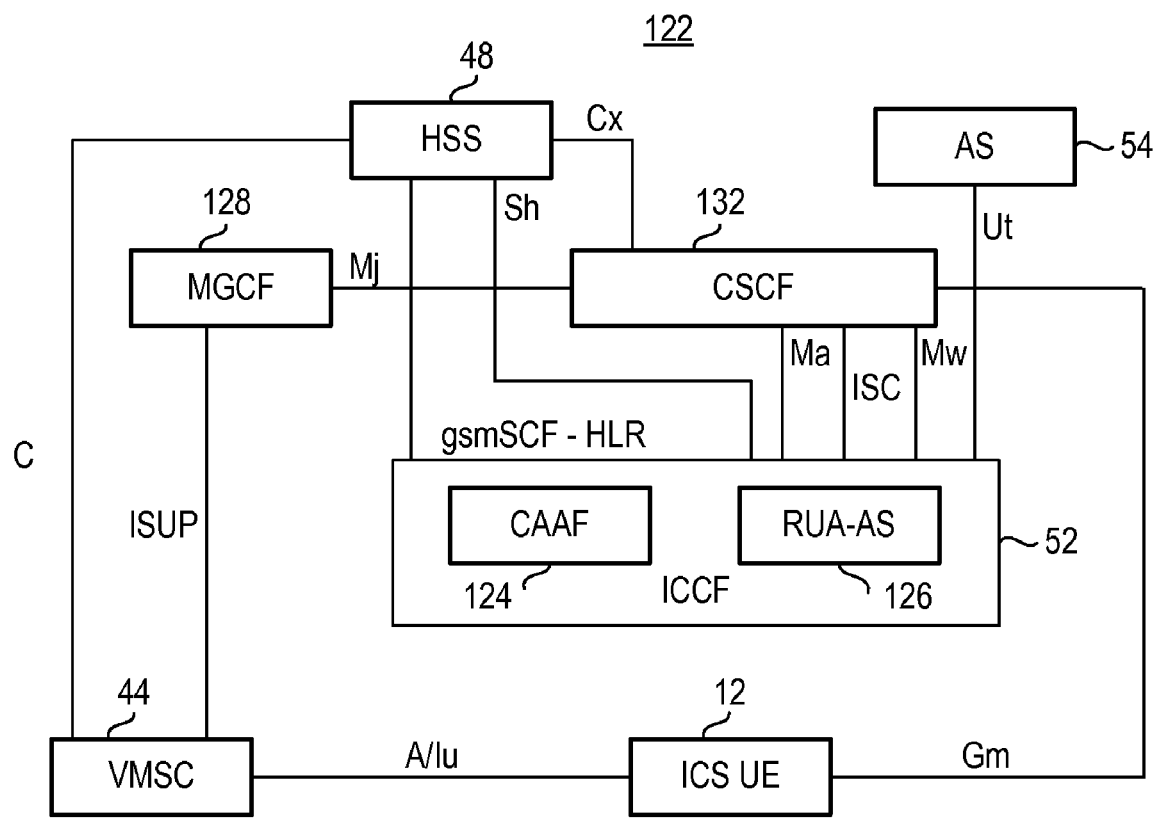
FIG. 7 illustrates a functional block diagram, similar to those shown in FIGS. 3-6, but here of another embodiment of the present invention.

FIG. 7 again illustrates a functional block diagram, shown at 122, also representative of various entities of the communication system 10. Again, commonly-referenced entities correspond with those shown, and described, in previous figures. The diagram shown in FIG. 7 is representative of an IMS adaptor approach for I1-cs and I1-ps.

The ICCF with Mw and the ISC for I2 for I1-cs is also used for I1-ps. The Mw interface is used for provision of IMS registrations over circuit-switched access. For I1-ps, only the ISC interface is used for insertion of the ICCF in the path of the IMS sessions established via the packet-switched access, and the user is registered in IMS via a GM reference point. For I1-cs, the Mw interface is used for registrations, and the Mw or the IFC for originations and terminations associated with the ICCF when presenting the SIP UA behavior to the S-CSCF on behalf of the UE and the ISC interface is used for establishment of bearer control signaling path. The ICCF presents the Ma reference point towards the I-CSCF, and ISC reference point towards the S-CFCF used for PSI routing of calls from the circuit-switched domain to the ICCF. The CAAF of the ICCF presents a gsmSCF-HLR interface towards the HSS for USSD signaling.

The XCAP protocol content is included in the USSD, SMS, or other, message, such as that generated by the UE, as described above. The user-user protocol contents is structured like the non-imperative part of a standard L3 message and is comprised of a variable number of information elements of type 1, 2, 3, and 4. Different formats, e.g., TV and TLV formats and the categories of information, e.g., types 1, 2, 3, and 4, are set forth in technical specification number 3GPP TS 24.007 [I2]. Within the ICS protocol contents, the information elements may occur in an arbitrary order, and the information elements need only be included once. Each information element is formed of one or more octets.

Figure 8:
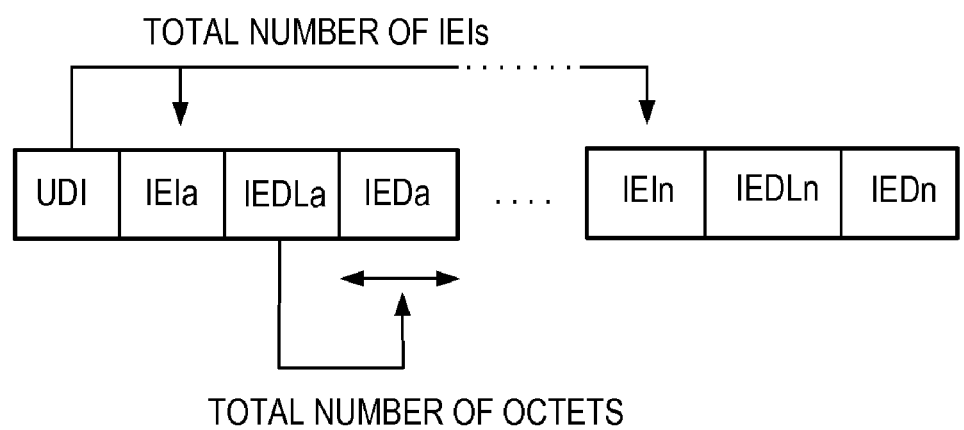
FIG. 8 illustrates a representation of an exemplary ICS User Data structure.

IMS Centralized requests, as noted previously, can span multiple USSD request in a single transaction, and the structure of the ICS User Data is as shown in FIG. 8.

The total number of User Data Items (UDIs) cannot exceed 128. If the most significant bit is set in the UDI, the UDI uses a consecutive eight bits (an octet). Otherwise, the UDI uses consecutive four bits (half an octet). The remaining three or seven bits are encoded in a big-endian order, e.g., with the most significant bit first.

For example, the integer value 0x0A would be encoded with one octet 0x8A. the integer value 0x06 would be encoded in four consecutive bits: 0x06.

The total number of unique Information Element Identifiers (IEIs) does not exceed 256. Depending on the IEI, the Information element Data Length (IEDL) and/or the Information element Data (IED) may not be present. The data type of the IEDL can be a: u_int8, an 8-bit, unsigned integer, or a mb_u_int32, a bit unsigned integer, encoded in multi-byte integer format.

A multi-byte integer consists of a series of octets, where the most significant bit is the continuation flag and the remaining sever bits are a scalar value. The continuation flag indicates that an octet is not the end of the multi-byte sequence. A single integer value is encoded into a sequence of N octets. The first N−1 octets have the continuation flag set to a value of one (1). The final octet in the series has a continuation flag value of zero (0). The remaining seven bits in each octet are encoded in a big-endian order, e.g., with the most significant bit first. The octets are arranged in a big-endian order, e.g., the most significant seven bits are transmitted first. In the situation in which the initial octet has fewer than seven bits of value, all unused bits must be set to zero (0). By way of example, the integer value 0xA0 would be encoded with the two-byte sequence 0x810x20. the integer value 0x60 would be encoded with the one-byte sequence 0x60.

The type of the IED is indicated by the corresponding IEI. The table can be thought of as being further separated in request/response IEIs and associated IEIs. A parser sequentially reads the USSD/SMS payload, and namely:

Read a request IEI, its IEDL and IED (i.e., XCAP_GET, XCAP_Put, XCAP_POST, XCAP_STATUS_CODE). A request IEI is followed by an IEDL, indicating the number of octets making up data that is to be interpreted as the resource URL, which is encoded in the IED. A response IEI is followed by the actual status and optional XCAP_Reason_Phrase is not found, the parser may assume a pre-configured Reason Phase.

Then, this is followed by finding its associated IEIs if there are more UDIs. If there are no more UDIs, the parser exits. Any unexpected IEIs are ignored. Then, upon reading another response/request IEI the parser again finds its associated IEIs as just-noted.

Exemplary response and request encoding codes are:

| IEI | value | IEDL present | IED encoding |
|---|---|---|---|
| XCAP_GET (retrieve content) | 0x4d | yes | as per following paragraph |
| XCAP_PUT (place content) | 0x4e | yes | as per following paragraph |
| XCAP_POST (pass data to a process) | 0x4f | yes | as per following paragraph |
| XCAP_DELETE (remove a resource from a server) | 0x50 | yes | as per following paragraph |
| XCAP_Status_Code | 0x51 | yes | mb_u_int32 |
| XCAP_Reason_Phrase | 0x52 | yes | as per following paragraph |
| XCAP_Header_Name | 0x53 | yes | as per following paragraph |
| XCAP_Header_Value | 0x54 | yes | as per following paragraph |
| XCAP_Body | 0x55 | yes | as per following paragraph |

The USSD payload is compressed using the compression algorithm defined in standard document 3GPP TS 23.042 in which, for optimal compression, the support for dictionaries, essentially a list of key words or phrases of up to 255 characters in length, is required. Dictionaries should be known to be a decoder and to a coder. An input stream is matched against entries in the dictionary and matching characters in the stream are replaced with a reference to the dictionary entry. Dictionaries are provided by the operator and include matches for frequently occurring strings, such as "http", ".com", and the domain fragment of a URI, as well as other frequent occurring strings of string fragments.

Thereby, through operation of an embodiment of the present invention, a circuit-switched, user equipment is able to configure an IMS service so that the IMS service is provided to the user equipment.

Presently preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims.

What is claimed is:

1. A method for facilitating providing of an IMS, IP Multimedia Subsystem, service, by a wireless network to a wireless, circuit switched connected UE, User-Equipment, device, said method comprising the operations of:
    detecting at the wireless network a UE-generated initiation message having network-decodable information that, when decoded, populates an initiation message for forwarding to an associated service node for configuring and managing IMS services, contents of the information being representative of a request for the IMS service to be provided from said associated service node through said network to the UE device; and
    encoding at the wireless network for forwarding to the UE device an initiation response message having UE-decodable information, said encoding responsive to receipt of a response message responsively generated at said associated service node to receipt of said forwarded initiation message at said associated service node the initiation response message being for facilitating the providing of said IMS service to the UE device by the associated service node.

2. The method of claim 1 wherein the UE-generated initiation message detected during said operation of detecting comprises one or more USSD, Unstructured Supplementary Service Data, messages.

3. The method of claim 1 wherein the UE-generated initiation message detected during said operation of detecting includes a request-type identification.

4. The method of claim 1 wherein the UE-generated, initiation message, when decoded, can populate a XCAP, XML Configuration Access Protocol, message.

5. The method of claim 1 further comprising the operation of decoding the UE-generated initiation message.

6. The method of claim 5 wherein said operation of decoding comprises a dictionary-assisted decompression of the UE-generated initiation message.

7. The method of claim 6 wherein the dictionary-assisted decompression comprises mapping octet values into text strings.

8. The method of claim 6 further comprising the operation of configuring a dictionary used pursuant to the dictionary-assisted decompression pursuant to over-the-air, OTA, signaling.

9. The method of claim 1 further comprising the operation of managing the network services related information.

10. The method of claim 1 wherein the initiation response message generated during said operation of generating comprises an XCAP, XML Configuration Access Protocol, message.

11. The method of claim 10 further comprising the operation of encoding the XCAP message.

12. The method of claim 11 wherein said operation of encoding comprises encoding the XCAP message into a USSD, Unstructured Supplementary Service Data, message.

13. The method of claim 10 wherein said operation of encoding comprises a dictionary-assisted compression of the XCAP message.

14. The method of claim 1 wherein the UE-generated initiation message detected during said operation of detecting comprises a CS, circuit-switched, -connected, UE-generated initiation message.

15. The method of claim 1 wherein the IMS service comprises an IMS Centralized Service.

16. The method of claim 1 further comprising the operation of acknowledging the detection of the UE-generated initiation message.

17. A network node apparatus for facilitating providing of an IMS, IP Multimedia Subsystem, service by a wireless network to a wireless, circuit switch connected UE, user equipment, device, said apparatus comprising:
    a detector configured to detect a UE-generated initiation message having network-decodable information that, when decoded, populates an initiation message for forwarding to an associated service node for configuring and managing IMS services, contents of said information being representative of a request for the IMS service to be provided from said associated service node through said network to the UE device; and
    an initiation response message generator at the wireless network configured to generate an encoded initiation response message having UE-decodable information, said encoding responsive to receipt of a response message responsively generated at said associated service node to receipt at said associated service node of said forwarded initiation message, the initiation response message being for facilitating the providing of said IMS service to the UE device by the associated service node.

18. The apparatus of claim 17 further comprising a decoder configured to decode the user-equipment generated initiator message.

19. The apparatus of claim 17 wherein the user-equipment generated initiation message comprises a USSD, Unstructured Supplementary Service Data, message, and wherein said decoder is configured to decode the USSD message and populate an XCAP, XML Configuration Access Protocol, message.

20. The apparatus of claim 17 wherein the initiation response message generated by said initiation response message generator comprises a USSD, Unstructured Supplementary Service Data, message.

21. The apparatus of claim 17 wherein said initiation response message generator are embodied at an ICCF, IMS Circuit Switch Control Function.

22. A method for facilitating providing of an IMS, IP Multimedia Subsystem, Service to a UE, user equipment, by a wireless network said method comprising the operations of:
    sending from the UE, at least one initiation message, the initiation message having network-decodable information that, when decoded, populates an initiation message for forwarding to an associated service node for configuring and managing IMS services, contents of the information being representative of a request for the IMS service to be provided from said associated service node through said network to the UE device;
    receiving, at the UE, at least one initiation response message, the initiation response message having UE-decodable information generated responsive to receipt of a response message responsively generated at said associated service node to receipt of said forwarded initiation message at said associated service node the initiation response message being for facilitating the providing of said IMS service to the UE device by the associated service node.

23. The method of claim 22 further comprising the operation of acknowledging the at least one initiation response message.

24. A network node apparatus for facilitating providing of an IMS, IP Multimedia Subsystem, service by a wireless network to a wireless, circuit switch connected UE, user equipment, said apparatus comprising an initiation message sender configured to send at least one initiation message, the initiation message sent by said initiation message sender having network decodable information that, when decoded, populates an initiation message for forwarding to an associated service node for configuring and managing IMS services, contents of said information being representative of a request for the IMS service to be provided from said associated service node through said network to the UE device; and a receiver configured to receive at least one initiation response message generated at the wireless network responsive to receipt of a response message responsively generated at said associated service node to receipt at said associated service node of said forwarded initiation message, the initiation response message being for facilitating the providing of said IMS service to the UE device by the associated service node.

* * * * *